US008504018B2

(12) United States Patent
l'Anson

(10) Patent No.: US 8,504,018 B2
(45) Date of Patent: Aug. 6, 2013

(54) SERVICE ROUTING FOR COMMUNICATION SYSTEMS

(75) Inventor: Colin l'Anson, Ottery St. Mary (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 493 days.

(21) Appl. No.: 12/449,244

(22) PCT Filed: Jan. 29, 2008

(86) PCT No.: PCT/EP2008/051036
§ 371 (c)(1),
(2), (4) Date: Jul. 30, 2009

(87) PCT Pub. No.: WO2008/092857
PCT Pub. Date: Aug. 7, 2008

(65) Prior Publication Data
US 2010/0105396 A1  Apr. 29, 2010

(30) Foreign Application Priority Data
Jan. 31, 2007 (GB) .................................. 0701748.6

(51) Int. Cl.
*H04W 40/00* (2009.01)

(52) U.S. Cl.
USPC ......... 455/428; 455/445; 455/440; 455/456.1

(58) Field of Classification Search
USPC ................ 455/414.2, 428, 440, 445, 456.1
See application file for complete search history.

(56) References Cited

U.S. PATENT DOCUMENTS

| | | | |
|---|---|---|---|
| 6,731,940 B1 | 5/2004 | Nagendran | |
| 6,748,433 B1 * | 6/2004 | Yaakov | 709/224 |
| 6,782,436 B1 * | 8/2004 | Baker | 710/43 |
| 7,139,827 B1 * | 11/2006 | Iwayama et al. | 709/227 |
| 7,433,929 B2 * | 10/2008 | Guilford et al. | 709/217 |
| 7,702,316 B2 * | 4/2010 | Kono | 455/412.1 |
| 2003/0023691 A1 * | 1/2003 | Knauerhase | 709/206 |
| 2003/0069043 A1 * | 4/2003 | Chhaochharia et al. | 455/561 |
| 2004/0203777 A1 * | 10/2004 | Watanabe et al. | 455/435.2 |
| 2004/0224682 A1 * | 11/2004 | Kang | 455/433 |
| 2005/0113108 A1 * | 5/2005 | Kadakia et al. | 455/456.1 |
| 2005/0176433 A1 * | 8/2005 | Wilson | 455/445 |
| 2005/0193144 A1 * | 9/2005 | Hassan et al. | 709/238 |
| 2006/0062373 A1 * | 3/2006 | Chervets et al. | 379/265.03 |
| 2007/0082668 A1 * | 4/2007 | Silver et al. | 455/432.3 |
| 2008/0002820 A1 * | 1/2008 | Shtiegman et al. | 379/211.02 |
| 2008/0032703 A1 * | 2/2008 | Krumm et al. | 455/456.1 |
| 2008/0039101 A1 * | 2/2008 | Callaway | 455/445 |
| 2008/0076398 A1 * | 3/2008 | Mate et al. | 455/414.2 |
| 2008/0248820 A1 * | 10/2008 | Lohtia | 455/466 |

* cited by examiner

FOREIGN PATENT DOCUMENTS

| | | | |
|---|---|---|---|
| EP | 1 162 854 | * | 12/2001 |
| EP | 1162854 A | | 12/2001 |
| FR | 2882485 A | | 8/2006 |

OTHER PUBLICATIONS

International Search Report issued May 6, 2008 in Application No. PCT/EP2008/051036.

*Primary Examiner* — Kamran Afshar
*Assistant Examiner* — Marisol Fahnert

(57) ABSTRACT

A communication system and method is disclosed. The communication system comprises: a plurality of terminals, including a mobile communication device; and a routing server. The routing server is adapted to use the location of the mobile communication device and to preconfigure the routing of a service to a terminal via an appropriate communication protocol based upon the determined location of the mobile communication device.

19 Claims, 4 Drawing Sheets

SERVICE ROUTING FOR COMMUNICATION SYSTEMS

Relevant Applications

This Application is a national phase application of International Application No. PCT/EP2008/051036, filed on Jan. 29, 2008, which claims priority of GB Application No. 0701748.6, filed on Jan. 31, 2007, which is hereby incorporated by reference in its entirety.

FIELD OF THE INVENTION

This invention relates to the field of communications, and more particularly to the field of routing services to mobile communication devices.

BACKGROUND

With the development of communication technology, it is now common for users of communication systems to have multiple communication devices which may or may not be adapted to use multiple communication networks and/or protocols. Such communication devices can include wireless communication devices able to communicate over wireless networks, Personal Computers (PCs), Voice over Internet Protocol (VoIP) telephones, and wireless Personal Digital Assistants (PDAs). These communication devices may establish communications with one or more communication networks, such as circuit-switched, packet-based, or wireless communication networks.

Depending on the location of a user, the user may have a preferred communication device for making and receiving a particular type of communication service (for example, a telephone call). For example, when a user is at work in the office, the user may prefer to use a work-based telephone instead of a mobile device to receive telephone calls. Furthermore, if several communication devices are available to the user in the office, the user may have a further preferred device for receiving calls. The user may also desire all or a subset of the available devices to ring, so as to enable a choice of which device to use based on factors including device proximity and the cost of using a device.

It is known to provide call forwarding functionality within telephone systems. However, most users do not make use of such functionality due to the time and effort required to correctly configure the call forwarding mechanism. This is particularly problematic for a user that frequently changes location, since repeated configuration of the call forwarding functionality would be laborious and time-consuming.

A communications service provider may also face problems with poor coverage in certain locations. Consequently, a user's experience of using a service may be worsened at such locations.

It is therefore desirable to develop an improved system for automatically routing communication services such as audio calls, video calls and the like to one or more terminals in a communications system.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
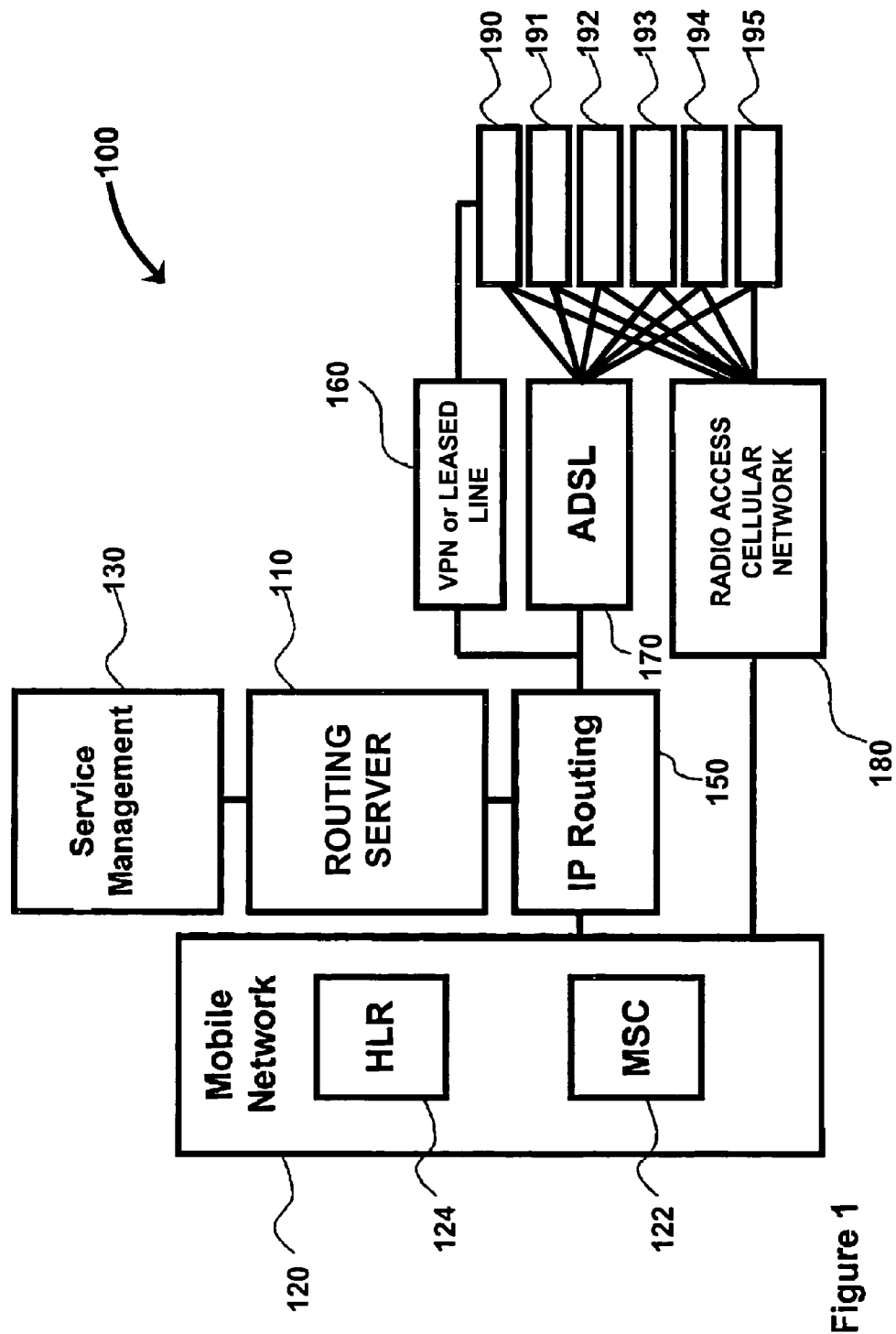
FIG. 1 is a high-level block diagram illustrating a communication system according to an embodiment of the invention.

According to an aspect of the invention, there is provided a communication system comprising: a plurality of terminals, including a mobile communication device; and a routing server adapted to utilize the location of the mobile communication device and to preconfigure the routing of a service to a terminal via an appropriate communication protocol and/or network based upon the determined location of the mobile communication device.

According to another aspect of the invention, there is also provided a method of routing a service in a communication system comprising a plurality of terminals, wherein the method comprises: determining the location of a mobile communication device; and routing the service to a terminal via an appropriate communication protocol based upon the determined location of the mobile communication device.

The invention provides a communication system comprising a plurality of terminals and a plurality of communication protocols for delivering communication services to the terminals. The communication system also comprises a routing server adapted to utilize knowledge of the location of a mobile communication device and to route a communication service to one or more terminals based upon the determined location of the mobile communications device.

Information about the location of a mobile communication device, and therefore its user, is used to determine the most appropriate or preferred way of routing a communication service via one or more communication networks. At present, it is likely that a typical communication service to be routed by the invention is a telephone call. However, the invention is also applicable to other communication services such as video calls, Short Message Service (SMS) messages, electronic mail, and personalized media.

The delivery of the communication service can be made using a choice of appropriate communication technology (i.e. cellular, Voice over Internet Protocol (VoIP), etc.) and/or communication network (i.e. Public Switched Telephone Network (PSTN), cellular, VoIP service provider, etc.) whether or not the provider of the routing service is the provider of the communication service being routed. For example, the routing choice may be made between cellular, VoIP over broadband, VoIP over VPN, PSTN, a separate VoIP service provider (eg Skype) or another network protocol.

The communication device(s) (and respective communication protocol and network) to which the communication service is delivered can be dependent on a predetermined user preference with respect to the location, availability of the user and/or terminals associated with the user. Assuming that the user carries an associated mobile communication device, and that the mobile communication device therefore goes wherever the user goes, information about the location of the user can be obtained from the mobile communication device. In other words, the mobile communication device may be used to track the movement and/or location of its user. Purely by way of example, such location information can be obtained from the mobile communication device using appropriate techniques such as zone location technologies, Global Positioning Satellites (GPS), triangulation, and cell ID.

It will therefore be appreciated that the invention may allow a user of mobile communication device to define preferences as to where and/or how communication services should be delivered, depending on their location. Using such preferences, the invention can make routing choices and cause a communication service to be automatically routed to other terminals based on the location of the communication device. It may therefore be preferable to implement an editable database or table of information regarding at least one terminal associated with a user of the mobile communication device. In this way, the user may be able to access and modify such information as required.

For a better understanding, an example of a communication system according to the invention will now be described with reference to FIG. 1.

The system 100 of FIG. 1 determines the location of a user and routes a communication service (such as a telephone call) to one or more terminals via an appropriate communication network.

A mobile communication device (not shown), such as a cellular phone, is associated with the user. The user carries the mobile communication device so that it goes wherever the user goes. Thus, when the user moves within the range of a certain communication network, for example the home or the office, the mobile communication device also moves within the range of the communication network.

Device locating means within the mobile communication device are adapted to detect the location of the device and/or detect that the communication network is available and to inform the routing server of the determined location of the mobile communication device. Thus, based upon the determined location of the mobile communication device, the system 100 decides which terminal and communication network and/or protocol to use in order to deliver the communication service.

To store information regarding the location of the user (or their associated mobile communication device), the system 100 includes a routing server 110.

The routing server 110 stores updated information regarding routing of calls to the location of the user in suitable storage means, such as a database or table. Also stored by the routing server is information relating to a user's preference as to which terminal(s) a service should be provided to when the user at a particular location. This information is used to determine a routing table entry prior to any calls being made. For example, the user may have defined that they prefer to receive telephone calls on a telephone connected via their broadband Asynchronous Digital Subscriber Link. (ADSL) connection using an Analogue Telephone Adapter (ATA) when at home, even if the call was initially directed to their mobile communication device. These routing preferences may be extended if presence information is available. Presence information includes attributes like "busy", "in a meeting", "away from PC", amongst other parameters.

When a third party requests delivery of a service to the user, for example when a voice-based telephone call is made to the user's mobile communication device using the appropriate network address or number, the routing server 110 knows the routing choice. This was created using the stored location information of the user and the stored user preferences to determine the appropriate terminal or terminals to which the service should be routed.

In other words, the role of the routing server 110 is to route a service via an appropriate communication network to one or more preferred terminals, the routing choice being based upon the determined location of a user. Further, the routing choice may also be based on additional factors, such as cost, quality of service, presence information, or another SLA parameter.

The routing server is in communication with a mobile communication network 120 (i.e. a cellular network) used by the mobile communication device. Using the mobile communication network 120, the mobile communication device sends information about the determined location of the mobile communication device to the routing server 110. In a different embodiment, the location information of the mobile may also be extracted from the mobile network itself. Whatever method is used, this information is delivered to the routing server.

In one embodiment, whenever a change in location is determined by the mobile communication device, updated location information is sent by the mobile communication device to the routing server 110 via the mobile communication network 120. In this way, the most recent location information can be used to determine the location of a user and therefore be used to route a service. If the mobile communication device is in a location that provides no access to the mobile communication network 120 or an alternative, for example an ATA connected to a domestic broadband connection, calls can be immediately routed. This overcomes a delay problem associated with other methodologies which occurs if the location of a user is determined after the user is called and if the user location cannot be rapidly determined from the associated mobile communication device.

Further, details of a user preference may be stored in the routing server 110 as to how to route a particular service if the mobile communication device has no access to the mobile communication network 120 (i.e. is not within the network coverage area or the mobile communication device is switched off).

The routing server 110 is connected to the mobile network 120. In the example shown, the mobile communication network 120 is a 2G GSM cellular network.

Included within the mobile communications network 120 is a Mobile Switching Centre (MSC) 122 and a Home Location Register (HLR) 124. The primary role of the MSC is to route calls and messages for a user of the mobile network. To achieve this it obtains key parameters from the HLR 124 concerning authentication, service profile, location information and activity status. Preferably entries are made in the HLR 124 to enable the MSC 122 to forward a call intended for a user to the routing server via the IP router (150). Alternative means to achieve this may require the use of Intelligent Network services like number translation and call forwarding that will enable the call request to be routed to the routing server The routing server is also in communication with a service management unit 130 to enable the routing server to be provisioned with information about the subscriber. This will include the subscriber's ability to use the service, the different distinguished identities they have in each network they may want to route calls to/from. These other networks are connected directly or via gateways. In the case of an enterprise PBX zone (190) connection can be made via a leased line or virtual private network. The routing server would be provisioned with the contact details, a telephone number or other unique identifier like a SIP address, of the individual on that PBX. In other embodiments, other service providers may be used and the call requests and traffic are routed via a gateway of the service provider that can then use means like ADSL to reach the subscriber at their office or home zones (191-195).

First 190 to sixth 195 user zones are defined with respect to particular locations.

For example, the first user zone 190 is defined to be a user's office with one or more terminal devices for receiving communication services. These terminal devices may include, for example, an analogue telephone adapter VoIP phone, a PC, a POTS-type phone connected to an office PBX and a wireless PDA. Thus, the VoIP phone and the PC may each be connected to the ADSL link 170 or the VPN or leased line 160, the POTS-type phone may be connected to the PSTN, and the wireless PDA may be connected to the existing cellular network 180, the wireless. PDA being the mobile communication device associated with the user. Of course, the wireless PDA may be adapted to support both cellular communications and local wireless communications (such as a Bluetooth or 802.11 wireless connection to the ADSL link 170 or the leased line 160).

In a similar way, the remaining user zones are also defined with respect to particular locations and the terminal devices available at each location. Purely by way of example, Table 1 below details the definition of the first 190 to sixth 195 user zones of FIG. 1.

TABLE 1

| User Zone | Location/Name | Terminal Devices |
|---|---|---|
| First User Zone 190 | Office | VoIP phone; PC; POTS-type phone to office PBX; and Wireless PDA via ADSL. |
| Second User Zone 191 | Home | 2 PCs; 1 POTS-type phone; 1 Analogue telephone adaptor via ADSL; and 1 Wireless PDA via ADSL |
| Third User Zone 192 | Hot Spots | 1 Wireless PDA via ADSL |
| Fourth User Zone 193 | Branch Office | VoIP phone with analogue telephone adaptor; and 1 Wireless PDA via Cellular |
| Fifth User Zone 194 | Hotel | VoIP phone client on a portable PC; and 1 Wireless PDA via ADSL |
| Sixth User Zone 195 | Out and About | 1 Wireless PDA via Cellular |

As discussed above, when a request is made to provide a user with a communication service, for example when a call is made to a user, the routing server 110 has used the location information it has stored from a mobile communication device associated with the user to determine where to route the service (i.e. which, user zone to route the call to).

In determining how to route the call, the routing server 110 may further use Service Level Agreement (SLA) factors in order to decide which terminal(s) the service should be routed to. These factors can include user defined preferences as to which terminal is the most appropriate, costing considerations and Quality of Service (QoS) consideration. Although it is likely that the user defined preferences will take into account costing and QoS considerations, it is also envisaged that the routing server may over-rule the user defined preferences by placing more importance on other factors, for example the QoS. These additional considerations for call routing are set up via the service management unit 130.

Once it is determined how the service should be routed and the decision is stored in the routing table, the appropriate communication network and protocol is used.

Figure 2:
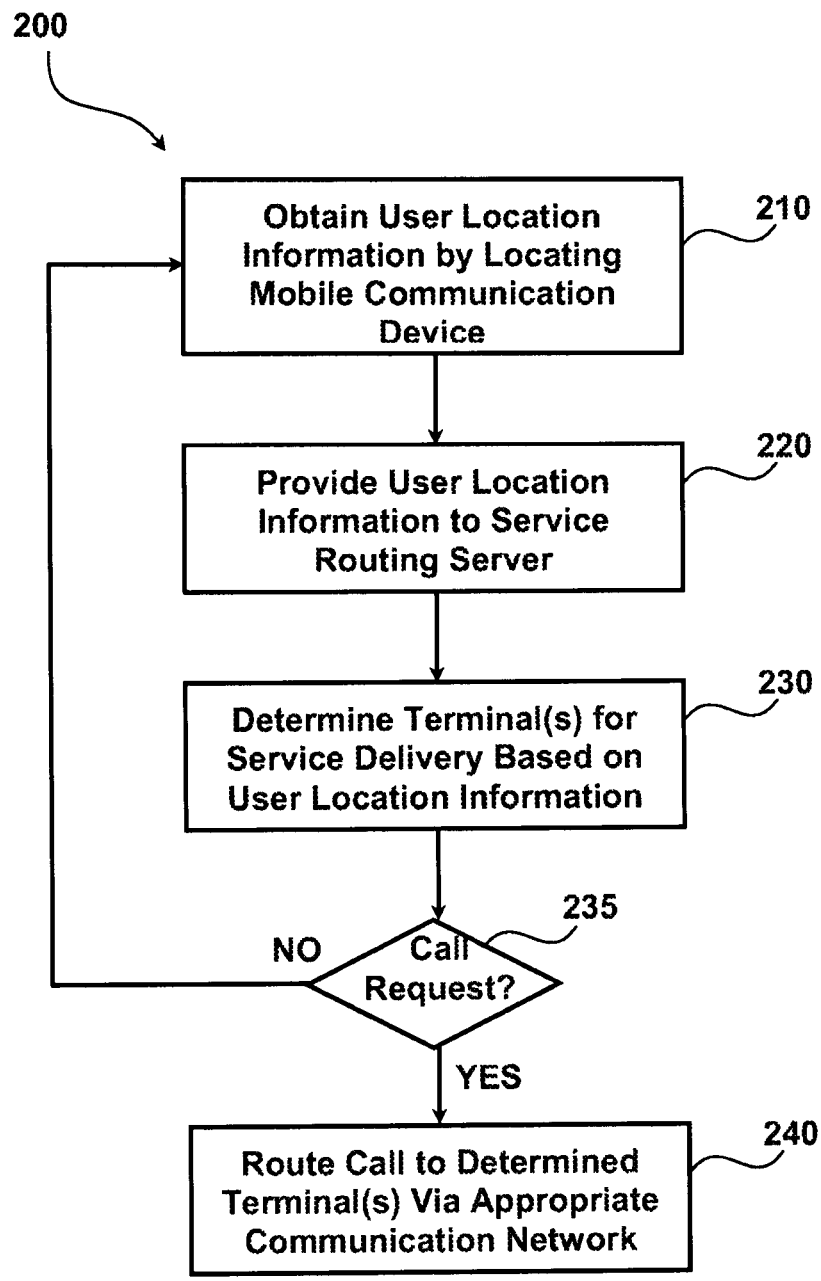
FIG. 2 is a flow diagram of a routing method according to an embodiment of the invention.

Referring now to FIG. 2, an exemplary routing method 200 of the invention will now be described.

The method 200 begins with step 210. In step 210, information about the location of a user is obtained by locating the position of the mobile communication device that is associated with the user. Purely by way of example, the location is detected by the mobile communication device having a GPS receiver, a zone location solution, or some other radio means by which the location can be determined (for example, WLANs where the dynamically assigned IP address can be used to identify a particular network).

Once the location information is determined in step 210, the method continues to step 220 in which the location information is provided to the routing server 110 and stored therein. Preferably, updated location information is provided to the routing server 110 every time a change in the location information is determined.

After having stored updated location information, the method proceeds to step 230. In step 230, the routing server determines which terminal(s) the call should be routed to, based on the location information stored about the user. This determination may also be based on user defined conditions, for example it may be preferred to have calls routed via a particular communication network using a particular communication protocol if it is available for economic or QoS reasons. The pre-prepared routing information is used if and when a call is made to the user.

In step 235, it is determined whether or not an incoming call request occurs. The method returns to step 210 if no incoming call request occurs, whereas the method proceeds to step 240 if an incoming call request does occur.

Depending on the terminal(s) to which the call is to be routed, the routing server is able to route the call via one ore more appropriate communication protocols in step 240.

Figure 3:
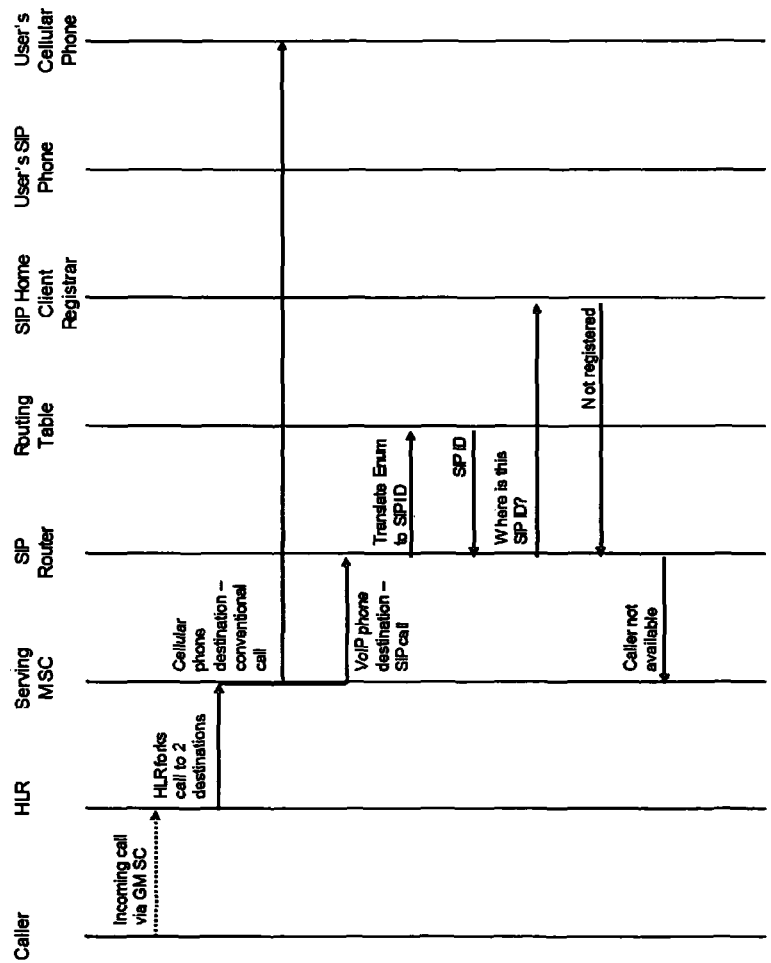
FIG. 3 is a communication flow diagram illustrating an exemplary situation according to an embodiment of the invention.

An exemplary communication flow is shown in FIG. 3. This will now be referred to in order to illustrate a scenario in which no re-routing action is required.

In this example, a user (hereinafter referred to as "UserA") is away from their home and the office and not within any hotspot location. In fact, UserA is sitting on a beach with a mobile communication device (a mobile phone) in his possession.

A third party user (hereinafter referred to as "UserB") makes a phone call to A's mobile phone using an associated mobile phone number.

Preferences defined by UserA, and stored in the routing server 110, dictate that in such a situation the call will be routed to both UserA's mobile phone and UserA's VoIP phone (located at home), since UserA desires to cater for the possibility that the mobile phone may have been misplaced. Thus, with the mobile phone having updated the location information in the routing server 110 that it has left the user-zones, the routing server 110 determines that the call should be routed to both UserA's mobile phone and UserA's VoIP phone, and routes the call accordingly (as shown in FIG. 3).

The flow diagram of FIG. 3 shows forking of the call by the HLR and the two call setup procedures in parallel. Although this is a functional example, it is not a preferred method of implementation, because it may possibly leave a loose end if a 'caller-not-available' message is returned to the MSC.

Figure 4:
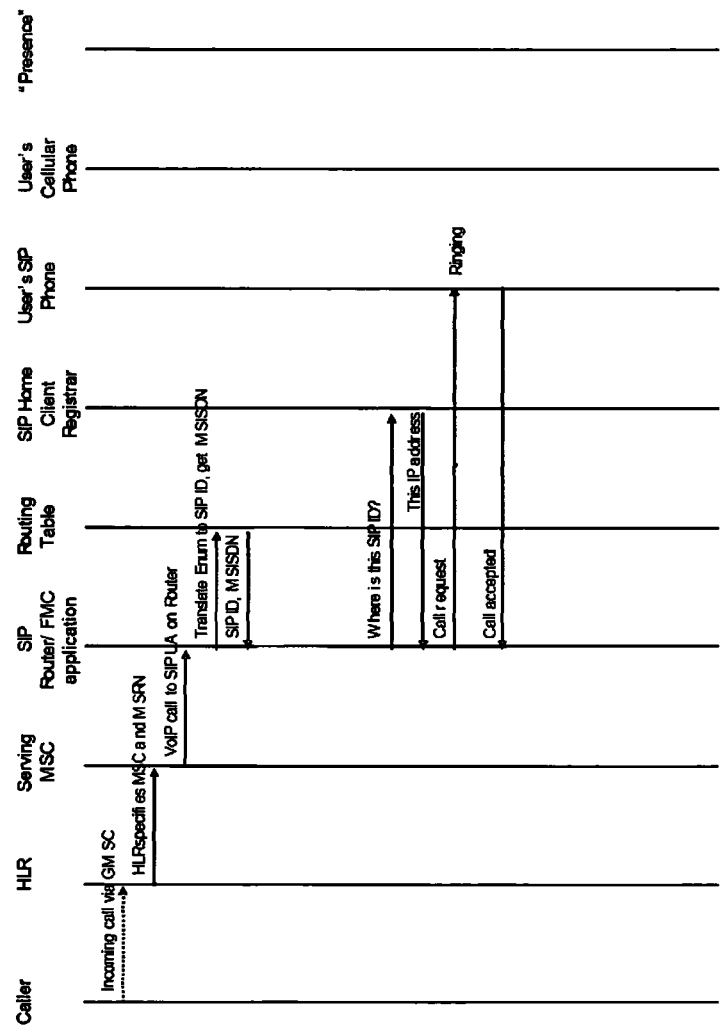
FIG. 4 is a communication flow diagram illustrating another exemplary situation according to an embodiment of the invention.

Another exemplary communication flow is shown in FIG. 4. In this example, UserA is at home (i.e. within the user zone, "Home"). However, unlike the definition of the second user zone 191 in Table 1, UserA has a mobile phone and a VoIP analogue telephone adaptor phone which can both use an available ADSL link to make and receive phone calls. Accordingly, UserA has defined the user preferences associated with the "Home" user zone so that all available terminal devices at home should ring when a call is directed to UserA.

When UserA returns home, the mobile phone detects its presence within the user zone of "Home" and updates the location information in the routing server 110 accordingly. Calls will now be routed via the ADSL link and not via the cellular network's access.

UserB makes a phone call to UserA's mobile phone number using the associated mobile phone number.

Thus, with the mobile phone having provided the location information in the routing server 110 that UserA is within the user zone of "Home", the routing server 110 is configured such that the call should not be routed to UserA's mobile phone but only to UserA's VoIP phone via UserA's ADSL link, and routes the call appropriately (as shown in FIG. 4).

The flow diagram of FIG. 4 shows the VoIP phone terminations of the call from UserB.

This initial address message from UserB comes from a fixed/public network into the mobile network 120 and is directed to the serving MSC 122. This is a number that is terminated by the routing server 110 which is connected to the serving MSC 122. At this state, the call is made to the routing server 110 which then takes control of routing the call.

If redirection fails, it is possible for the call to be re-routed as a conventional mobile phone call. Thus, it will be appreciated how the invention receives an incoming mobile phone call request and routes the call via VoIP (and then to a mobile phone call if the VoIP call subsequently fails). It is noted, however, that only the VoIP call terminations are shown in FIG. 4.

The invention may also be extended to provide the feature of managing features and/or functionality of a mobile communication device dependent upon its location. In other words, not only can the location information be used to control the routing or communication services, but it can also be used to-reconfigure the mobile communications device (i.e. activate/deactivate functions or features of the device).

For example, in the situation of FIG. 4, UserA can receive calls via a mobile phone or a VoIP phone via an ADSL link when within the "Home" user zone. Assuming it will be cheaper for UserA and/or UserB to make the phone call via the ADSL line rather than via a mobile/cellular network, the routing server will preferably be configured to route call to UserA via the ADSL link when UserA is in within the "Home" user zone. However, since the VoIP/WLAN mode on the mobile communication device may not always be activated, the routing server can be adapted to configure the mobile communication device and ensure that a VoIP/WLAN mode is turned on when the device enters the "Home" user zone. Put more briefly, when the mobile communication device updates the routing server that its location is "Home", the routing server triggers a device management configuration service which configures predetermined functions of the device.

To provide a better understanding of this functionality, another exemplary situation will now be described, wherein UserA is returning home and carrying an associated mobile phone.

The mobile phone is constantly monitoring its location to determine its location. Once the mobile phone recognizes that it is within the user zone "Home", it updates the routing server with the appropriate location information. The routing server stores the updated location information and instructs a billing system to use a "home" tariff. The routing server also alerts a device management server of the new device location.

UserA has a dual mode mobile phone (i.e. both a VoIP/WLAN mode and a conventional Cellular mode) and the device management server discovers this from a database.

The device management server sends a configuration instruction to the mobile phone which causes the mobile phone to turn on the VoIP/WLAN functionality of and to change the preferred outgoing call mode to VoIP/WLAN rather than cellular. Information regarding UserA's preferred routing, as stored in the routing server, may also be updated to designate that the WLAN/VoIP connection is preferred.

Further, when UserA subsequently departs from home with the mobile phone, the mobile phone detects this change in location and updates the routing server accordingly. The routing server stores the updated location information and relays this information to the billing system and the device management server. The device management server then sends a configuration instruction to the mobile phone which causes the mobile phone to turn off the VoIP/WLAN functionality and to change the preferred outgoing call mode back to Cellular (rather than VoIP/WLAN). Information regarding UserA's preferred routing, as stored in the routing server, is also updated to designate that the Cellular protocol is preferred.

Of course, the device management server may also be adapted to configure the mobile phone based on other information, such as information relating to the user or status of the mobile phone. The device management server may also be adapted to deliver software and other content to the mobile phone based upon its determined location.

It will be appreciated that the invention provides a call routing (or, more generally, a communication service routing) approach which allows routing of a call to a user in the most cost effective manner and with minimum of involvement by the user. Delivery of the communication service is still controlled by the network operator or service provider and permits them to generate the maximum cost savings in call completion whilst also ensure a necessary QoS.

The approach taken by embodiments of the invention means that a service provider operating the routing server does not need to own all the technology or networks used to deliver the call, but can instead make a Service Level Agreement (SLA) based decision on the routing possibly using another service provider. It should be understood that the innovation is to make the routing choice from information on the location of the user taken automatically from the network's knowledge of the location of the user. The determination, storing and user to create routing of location information is completed in advance of any routing request. It is not completed in real time when the routing request occurs.

The invention may not require the user to purchase, install or use special equipment in order to benefit from its advantages.

While specific embodiments have been described herein for purposes of illustration, various modifications will be apparent to a person skilled in the art and may be made without departing from the scope of the invention.

The invention claimed is:

1. A communication system comprising:
   a plurality of terminals, including a mobile communication device; and
   a routing server storing data for each of a number of defined locations, that data including which of said plurality of terminals are associated with each defined location, said data further including user preferences indicating which of said terminals at each defined location is to receive an incoming communication for said user irrespective of to which terminal that incoming communication was originally directed;
   wherein said routing server is configured to use a determined location of the mobile communication device to identify a corresponding one of said defined locations such that, upon receiving an incoming communication, said routing server then routes that incoming communication to one of said plurality of terminals based on said identified location corresponding to the determined location of the mobile communication device and further based on said user preferences indicating which of said terminals at that location corresponding to the determined location of the mobile communication device is to receive an incoming communication for said user irrespective of to which terminal that incoming communication was originally directed; and wherein the routing server further routes the incoming communication by overriding said user preferences based upon the quality of service provided when delivering the incoming communication to a terminal.

2. A communication system according to claim 1, wherein said routing server is configured to handle each and any of a phone call, and email and a Simple Message Service (SMS) message as said incoming communication.

3. The communication system according to claim 2, wherein the incoming communication is an email.

4. The communication system according to claim 2, wherein the incoming communication is a Simple Message Service (SMS) message.

5. The communication system according to claim 1, wherein said routing server further comprises a configuration service to configure a function of the mobile communication device, other than routing or communications functions, based upon the determined location of the mobile communication device.

6. The communication system according to claim 5, wherein the mobile communication device is configured to receive incoming communications via at least two different networks when located at one of said defined locations and wherein the configuration server is programmed to configure the mobile communication device to selectively receive incoming communications from one of said two different networks based on the determined location of the mobile communication device.

7. The communication system according to claim 1, wherein the routing server comprises a content unit for delivering software to the mobile communication device based upon the determined location of the mobile communication device.

8. The communication system according to claim 7, wherein the content unit is adapted to deliver the software based on information relating to at least one of: the user of the mobile communication device; and the status of the mobile communication device.

9. The communication system according to claim 1, wherein the routing server changes a tariff charged for incoming communications to the mobile communication device based on the determined location of the mobile communication device.

10. The communication system according to claim 1, wherein the user preferences dictate to which terminal to route an incoming communication intended for said mobile communication device when said mobile communication device is unavailable.

11. The communication system of claim 1, wherein said system is further configured for:

determining the location of a mobile communication device, wherein said mobile communication device is configured to selectively receive an incoming communication from either of at least two different networks when located at one or more defined locations; and automatically configuring said mobile communication device to receiving an incoming communication from a particular one of said at least two different networks based upon the determined location of the mobile communication device.

12. The communication system according to claim 11, wherein the particular one of said at least two different networks is selected based upon the cost of delivering the incoming communication to the mobile communication device.

13. The communication system according to claim 11, wherein the incoming communication is an email or Simple Message Service (SMS) message.

14. The communication system according to claim 11, wherein the system is further configured for:

storing data for each of a number of defined locations, that data including which of said plurality of terminals are associated with each defined location, said data further including user preferences indicating which of said terminals at each location is to receive an incoming communication for said user irrespective of to which terminal that incoming communication was originally directed; and using the determined location of the mobile communication device to identify a corresponding one of said defined locations such that, upon receiving an incoming communication, that incoming communication is routed to one of said plurality of terminals based on said identified location corresponding to the determined location of the mobile communication device and further based on said user preferences indicating which of said terminals at that location corresponding to the determined location of the mobile communication device is to receive an incoming communication for said user irrespective of to which terminal that incoming communication was originally directed.

15. The communication system according to claim 14, wherein the user preferences dictate to which terminal to route an incoming communication intended for said mobile communication device when the mobile communication device is unavailable.

16. The communication system according to claim 11, further comprising the system configured for changing a tariff charged for incoming communications to the mobile communication device based upon the determined location of the mobile communication device.

17. The communication system according to claim 11, further comprising the system configured for delivering software to the mobile communication device based upon the determined location of the mobile communication device.

18. The communication system according to claim 17, wherein delivering software to the mobile communication device is further based upon information relating to at least one of: the user of the mobile communication device; and the status of the mobile communication device.

19. The communication system according to claim 11, wherein:

determining the location of the mobile communication device is completed within the mobile communication device.

* * * * *